June 24, 1930.                G. W. YOUNG                1,766,162
                 ANTIDAZZLE SCREEN FOR MOTOR VEHICLES
                    Filed March 26, 1928      3 Sheets-Sheet 1
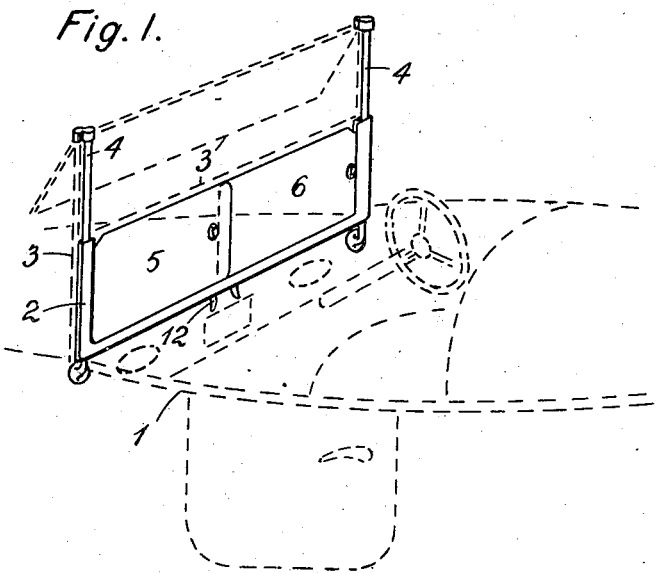
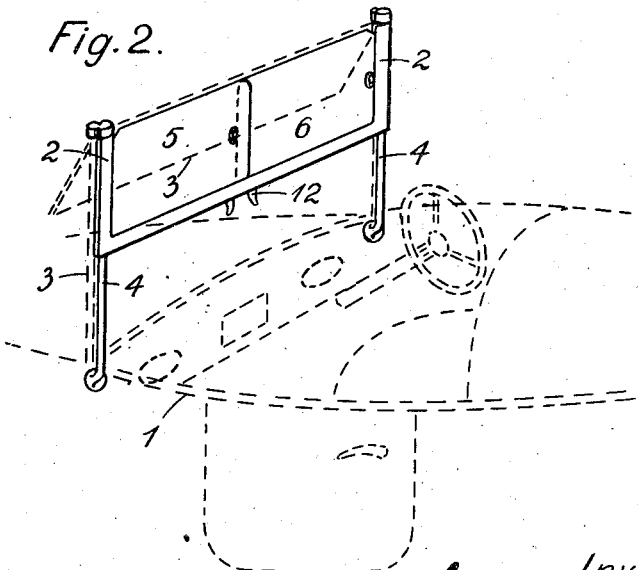
Inventor:
George William Young June 24, 1930.   G. W. YOUNG   1,766,162
ANTIDAZZLE SCREEN FOR MOTOR VEHICLES
Filed March 26, 1928   3 Sheets-Sheet 2

Inventor:
George William Young.

June 24, 1930.  G. W. YOUNG  1,766,162
ANTIDAZZLE SCREEN FOR MOTOR VEHICLES
Filed March 26, 1928  3 Sheets-Sheet 3
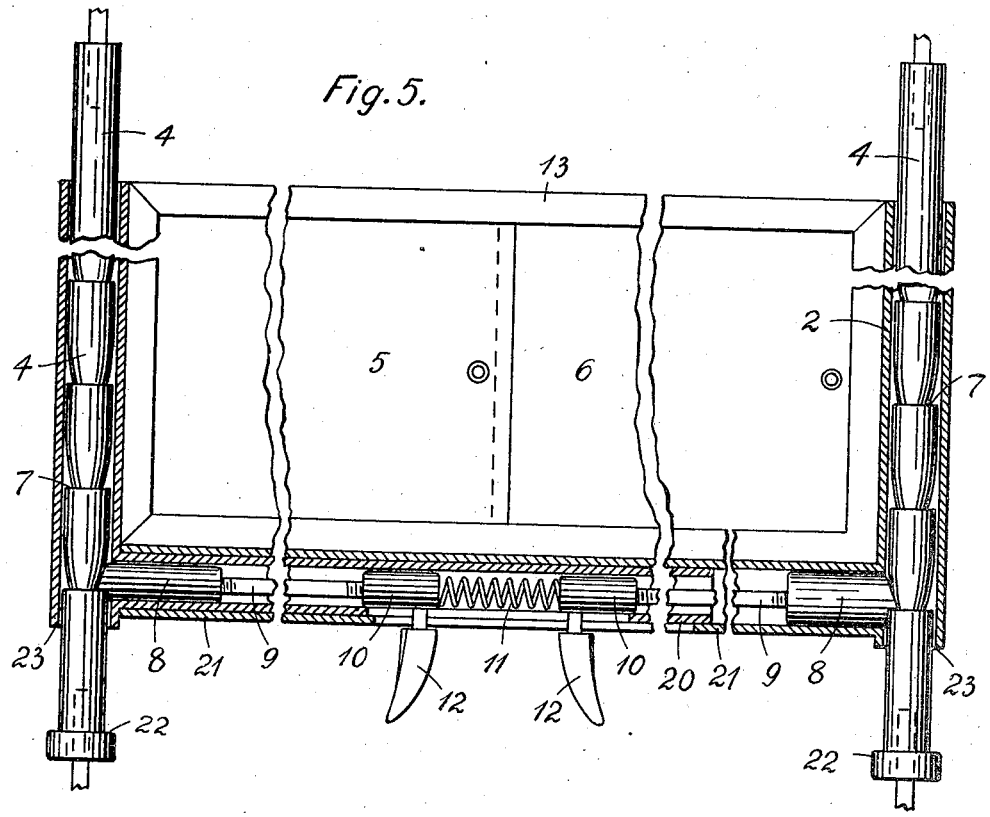
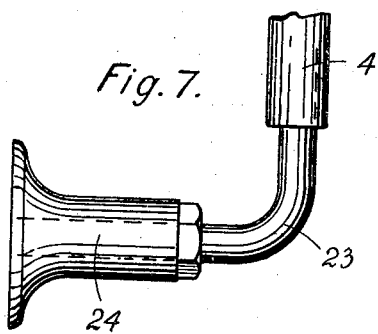
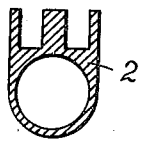
Inventor:
George William Young Patented June 24, 1930

1,766,162

UNITED STATES PATENT OFFICE

GEORGE WILLIAM YOUNG, OF LONDON, ENGLAND

ANTIDAZZLE SCREEN FOR MOTOR VEHICLES

Application filed March 26, 1928, Serial No. 264,857, and in Great Britain June 2, 1927.

For eliminating the dazzle of lights confronting the driver of a motor vehicle, various devices have been suggested, for instance coloured roller blinds which are drawn across the wind screen either vertically or horizontally, or glazed frames which are either adapted to swing about a pivot or to be slipped behind a pair of supporting brackets into operative position, or again, a slip blind which is held at one side by means of a runner block in a vertical guide tube or a frame fitted with fine metal gauze and held at one side by means of clamps on the wind screen or other standard. In the case of a horizontally drawn roller blind it has been proposed to mount the roller adjustably by means of a casing on a vertical standard having notches which co-operate with a spring for holding the blind in different positions, a rod at the free end of the blind being fitted with ball catches for engagement with recesses in channelled guides.

The object of the present invention is so to arrange the anti-dazzle screen that, while it is easily adjustable and non-obstructive, it is rigidly supported and not liable to rattle or to get out of order, and the invention consists in arranging a screen, in the form of a glazed metal frame, to slide in or on two vertical rods, the frame being provided with latches adapted to snap into notches in the rods for securing the frame in different positions.

Figure 3:
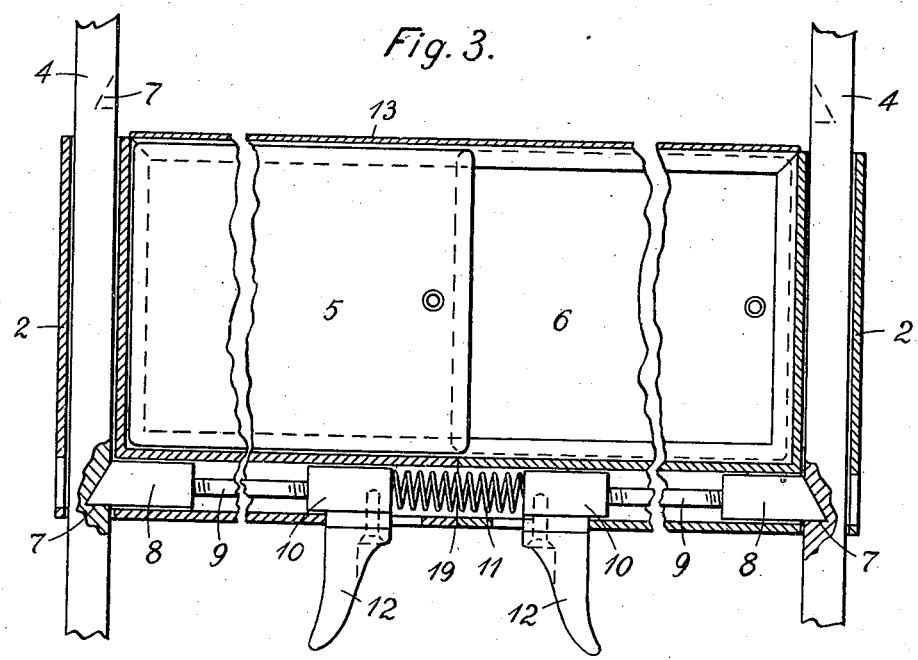
Figure 4:
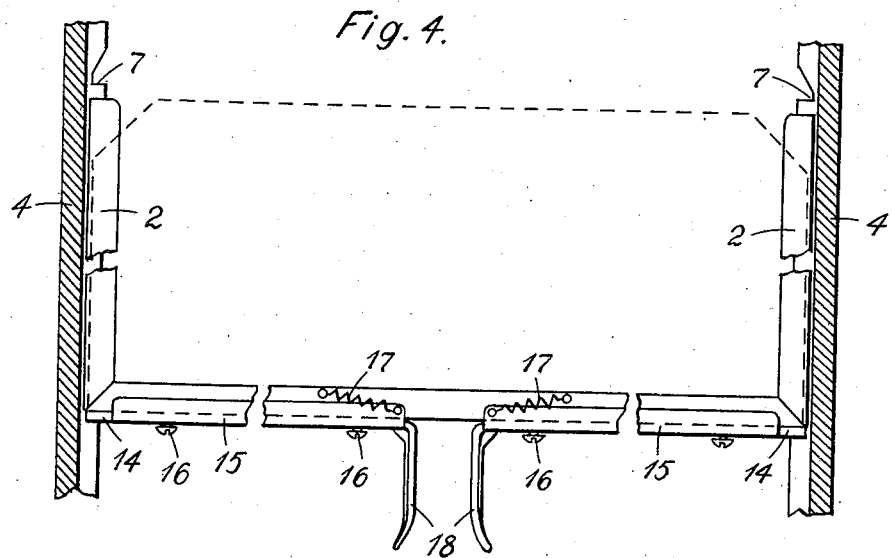

Fig. 1 of the accompanying drawings represents a perspective view of the anti-dazzle screen as applied to a motor vehicle and in its lowered position, Fig. 2, a similar view showing the screen raised, Fig. 3, a sectional view on an enlarged scale of one form of frame and guide construction, Fig. 4, a view of a modified construction, Fig. 5, a view of another modification, Fig. 6, a cross-section of one of the frame members of Fig. 5, and Fig. 7, a view on a larger scale of part of a guide member and its supporting bracket.

In the arrangement shown in Figs. 1 and 2, the vehicle 1 is provided with an anti-dazzle screen composed of a glazed metal frame 2 which is arranged behind and extended across the ordinary wind screen 3. The anti-dazzle screen is much lower than the wind screen and is adapted to slide on vertical guide rods 4 and to be fixed in different positions on the latter according to requirements.

The frame 2 is preferably fitted with two panes 5 and 6 of suitably coloured glass adapted to slide horizontally from one end of the frame to the other. This arrangement allows either half of the frame to be cleared of its screening effect when required. Conversely it allows the two panes to be used together for doubling the screening effect on confronting a very strong light. The colour of the two panes is preferably chosen so as to afford normally to passengers as well as to the driver a relief from the glare of strong sunlight reflected from roads and surrounding objects.

The construction of the screen, the frame and the guides may be varied according to requirements. Fig. 3 is an example of a frame formed of square tubing fitted with flanges between which the glass panes are guided. The guides 4 consist of square rods formed with notches 7 for engagement with latches 8, the latter being housed in the lower, horizontal member of the frame. The latches are connected by rods 9 to slides 10 between which a spring 11 is arranged so as to urge the latches into engagement with the notches. Finger-pieces 12 connected to the slides 10 and projecting through the side of the frame member, are used for retracting the latches when the frame is to be adjusted. The finger-pieces are arranged sufficiently close together to allow them to be gripped and operated by one hand. The frame, which includes a channelled capping piece 13, may be divided as shown at 19 into two halves which are cut to suit the width of the car and connected in any suitable manner.

In the modified arrangement shown in Fig. 4, the frame members are of channelled cross-section, and the frame is adapted to slide in grooves made in the guide rods 4. The latches 14 are formed at the ends of channelled slides 15 fitted on the bottom member of the frame. The slides are slotted to admit screws 16 which hold the slides in position and allow them to move through the required distance. Springs 17 control the slides which are retracted by means of finger-pieces 18.

The construction shown in Fig. 5 is very similar to that of Fig. 3, but the guide rods, the latches, the slides and the tubular parts of the frame members are of round cross-section, the notches 7 of the rods 4 being circumferential. To allow the frame to be conveniently adapted to various widths of cars, the bottom member of the frame is made of two telescopically adjustable tubes 20 and 21 each of which is integral with one of the vertical frame members. In manufacturing the frame on a large scale, the outer tube 21 is made long enough to meet all requirements, and it is subsequently, in case of need, shortened together with its flanges to suit any particular car, the rods 9 being shortened to correspond. Fig. 6 shows the preferred cross-section of the flanged frame members. The guide rods 4 are preferably provided with shoulders 22 whereon the frame 2 can rest in its lowermost position, the vertical frame members being formed with heels 23 adapted to take the thrust.

For a convenient mounting of the screen in the car, the guide rods 4 are preferably drilled at the ends for the reception of elbows 23 which are screwed into flanged posts 24 adapted to be fastened by screws to any convenient part of the car body. As the elbows are adjustable relative to the rods as well as to the posts it is easy to mount the screen so as to obtain a good sliding fit.

While the screen is primarily used as an anti-dazzle screen it is also useful, in combination with the ordinary wind screen, for admitting fresh air without creating disagreeable draught. For this purpose the anti-dazzle screen is placed behind the open top of the ordinary wind screen.

I claim:

In a motor vehicle having a wind screen, an anti-dazzle screen comprising a glazed metal frame arranged behind the wind screen and extending horizontally across the body of the vehicle, the frame being composed of hollow one horizontal and two vertical members, a pair of notched vertical rods whereon the frame is slidably guided by means of its vertical members, and a pair of spring-controlled latches housed in the lower horizontal frame member and adapted to engage in the notches of different guide rods for retaining the frame in various positions, the horizontal frame member being composed of two telescopically connected tubes each of which is integral with one of the vertical members of the frame.

GEORGE WILLIAM YOUNG.